INVENTOR,
GUSTAV SPIESS,
BY
ATTORNEY

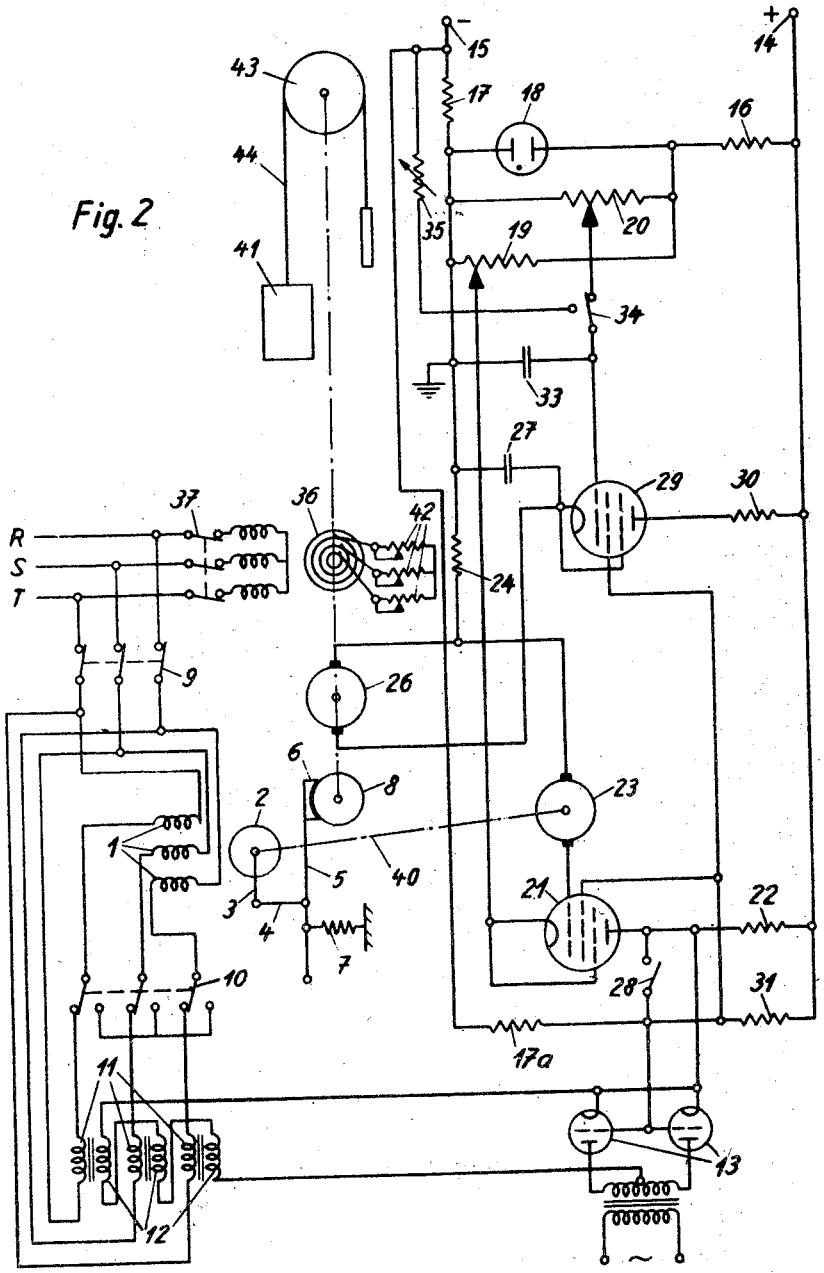

United States Patent Office 2,804,586
Patented Aug. 27, 1957

2,804,586
BRAKING ARRANGEMENTS FOR LIFTS

Gustav Spiess, Lucerne, Switzerland, assignor to Inventio Aktiengesellschaft, Hergiswil, Switzerland, a Swiss firm Application November 13, 1953, Serial No. 392,020

4 Claims. (Cl. 318—372)

The present invention relates to a braking arrangement for lifts.

Lifts travelling at speeds of over 1.2 m./sec. are generally constructed with a Ward-Leonard circuit arrangement, but such circuit arrangements have the disadvantage that they require direct-current motors having a separate convertor set to drive them, whereby the cost of production is considerably increased.

The present invention has for its object to provide a braking arrangement by means of which it is possible to construct lifts for speeds higher than 1.2 m./sec. with a motor drive having a normal slip ring armature, the braking period being just as short and smooth as with a Ward-Leonard circuit arrangement.

Acording to the invention, the braking motor remains connected to the supply system during the braking period and the direct current required to lift the brake is controlled through a rectifier from a valve which comprises as electrodes at least one anode, one cathode and one grid, the anode being connected to the positive terminal of a direct-current supply system, and one of the other two electrodes being connected to the negative terminal of a component voltage of the same direct-current supply system, while the other electrode is connected through a resistance to the negative terminal of the direct-current supply system, a tachometer dynamo being connected in parallel with said resistance in series with a condenser.

The electrical circuit diagram of a constructional example of a braking arrangement according to the invention is illustrated in the acompanying drawings.

In the drawings:

Fig. 2 is a similar view illustrating a modification.

Figure 1:
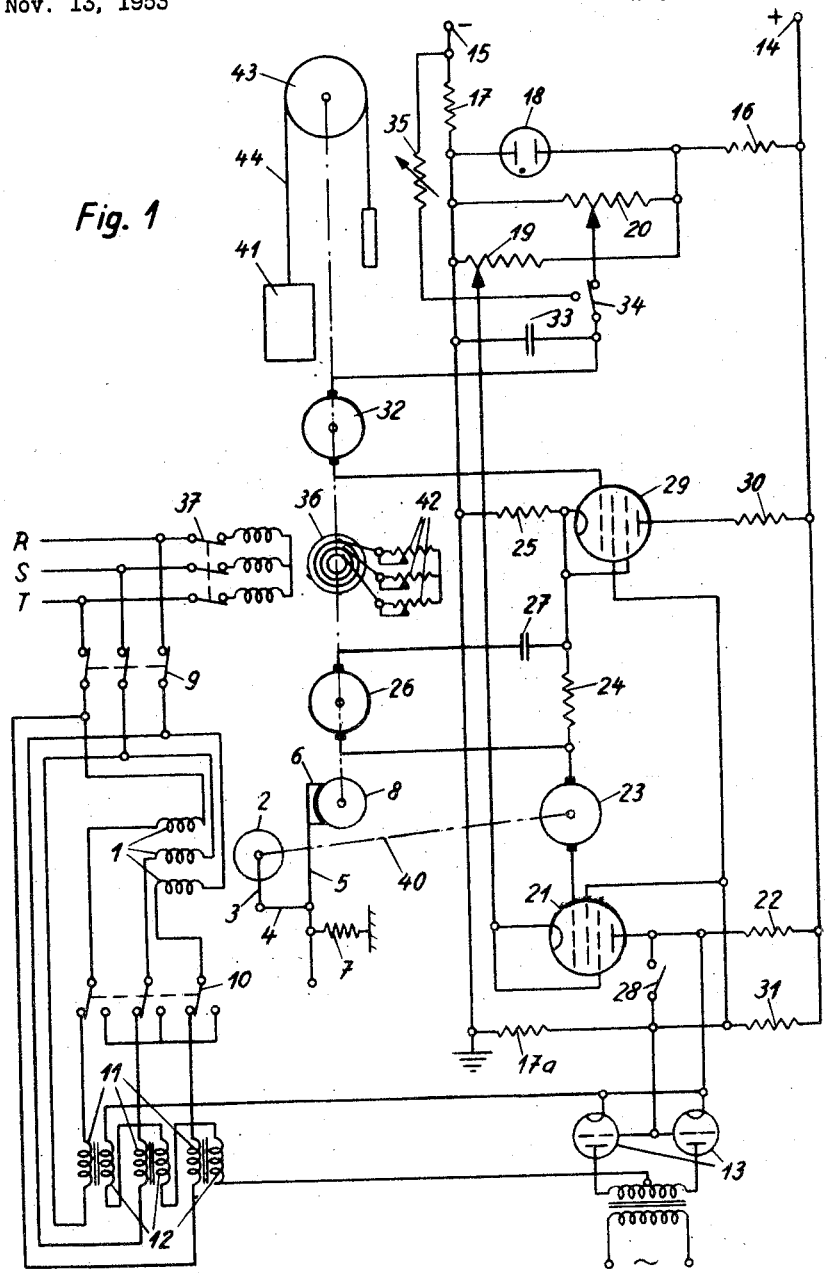
Fig. 1 is a schematic diagram showing the apparatus and a circuit exhibiting the invention for controlling the action of an elevator brake mechanism.

According to Figure 1 of the drawings, a brake-lifting motor comprising the stator windings 1 and the rotor 2 is provided. An arm 3 provided on the rotor is connected through a rod 4 to a lever arm 5, on which is mounted the brake shoe 6, which is pressed against the brake drum 8 by a spring 7. The arm 3 swings with the rotor 2 and actuates the rod 4 to retract the brake shoe 6 from the drum 8 against the action of the spring 7 when the stator winding is fully energized. The rotor 2 turns through a relatively small arc in lifting the brake shoe and thereafter remains stationary until the stator winding 1 is partly or fully deenergized when the spring 7 again urges the brake shoe 6 in engagement with the brake drum 8. The braking motor is adapted to be connected to the feed system RST through a switch 9. A star-delta switch 10 permits of connecting the windings 1 in star, or through choking coils 11 in delta. Magnetically coupled with the choking coils are three windings 12, which are fed with direct current through a valve rectifier 13.

Connected through series resistances 16 and 17 between the terminals 14 and 15 connected to a direct-current source is a glow discharge tube 18, the voltage of which is applied to two potentiometers 19 and 20. The direct-current voltage tapped from the potentiometer 19 is applied to the cathode of an electron tube 21, the anode of which is connected through a series resistance 22 to the terminal 14 as well as to the rectifier 13. The control grid of the tube 21 is connected in series with a tachometer dynamo 23 and resistances 24 and 25 and earthed through the latter together with the terminal 15. The tachometer dynamo 26 with a condenser 27 connected in series therewith is connected in parallel with the resistance 24. The tachometer dynamo 23 is mechanically coupled with the brake-lifting motor as indicated at 40. The armature of the generator 23 is accordingly driven by the brake lifting motor and moves with the limited rotational movements of the rotor 2. The tachometer dynamo 26 is driven by the lift motor 36. The anode of the tube 21 is connected through a switch 28 to the control grids of the rectifier valves. A conductor with the resistances 17 and 17a, connects the terminal 15 to the control grids of the rectifier.

A further electron tube 29 is connected with its cathode through the resistance 25 to the terminal 15, while the anode is connected through the resistances 30 and 31 to the grids of the rectifier valves, and through the resistance 30 alone to the terminal 14.

The control grid of the tube 29 is connected in series with the tachometer dynamo 32, which is also mechanically coupled with the lift motor 36. A condenser 33 is connected between the tachometer dynamo 32 and the terminal 15 and earth. A change-over switch 34 permits of connecting the tachometer dynamo 32 to the potentiometer 20 or through a variable resistance 35 to the terminal 15.

The control grid of the tube 21 can also be connected to the potentiometer 19, and the circuit parts 23 to 27 to the cathode of the said control valve.

The described circuit arrangement may be modified as shown in Figure 2, in which the resistance 25 in series with the cathode of the tube 29 is omitted and replaced by the tachometer dynamo 26. The tachometer dynamo 26 is connected in series with the resistance 24 and the condenser 27. The line containing the resistance 17a connects the grids of the two valves of the rectifier 13 directly to the terminal 15.

In operation the switch 37 is closed so that the driving motor 36 is operative to drive the sheave 43 over which the cable 44 passes to move the elevator car 41. The switch 9 is in the closed position and the switch 10 is in position connecting the stator winding 1 in star. In this position of the switch 10 the choke coils 11 are not included in the circuit so that the stator winding 1 is fully energized and the rotor 2 is rotated through a small rotational movement to hold the brake shoe 6 away from the brake drum 8 against the action of the spring 7. The rotor 2 then remains stationary while the energization of the stator winding 1 is maintained. During movement of the elevator car 41 between desired stops the switch 28 is in the closed position so that the cathode and the control grids of the rectifier tubes 13 are at the same potential and no current flows through the windings 12.

When it is desired to arrest movement of the elevator car the speed of the driving motor 36 is reduced by inserting some of the resistance 42 in circuit relationship with the rotor of the driving motor. The switch 37 remains in the closed position but the rate of movement of the elevator car is reduced. The current flowing in the stator winding 1 is a maximum value to hold the brake shoe 6 in retracted position from the brake drum 8. The switch 10 is shifted to a position connecting the stator winding 1 in delta with the choke coils 11 in circuit relationship with the stator winding 1. The switch 10 is shifted to the position shown in Figs. 1 and 2 at the initiation of the operation of arresting movement of the elevator car 41. The current flowing in the stator winding 1 is then reduced because the impedance of the choke coils 11 is at a maximum value in the absence of the flow of direct current in the windings 12. No direct current flows in the windings 12 because the switch 28 remains closed. A reduction of the torque provided by the brake lifting motor as a result of less current flowing in the stator winding 1 then permits the rotor 2 to retract slightly from its maximum rotated position as a result of the action of spring 7 and the brake shoe 6 engages the brake drum to provide retardation of the elevator car 41.

The switch 28 is opened so that the windings 12 receive direct current and the value thereof is dependent upon the retardation of the elevator car 41. The value of the direct current flowing in the windings 12 is controlled by the grid of the tube 21 which is connected to the resistance 24. As a result of the deceleration of the car 41 the speed of the generator 26 is lower and its terminal voltage is reduced. The condenser 27 then discharges through the resistance 24 and through the generator 26 causing an increase in the positive potential applied to the grid of the tube 21. This produces an increase in the plate current of the tube 21. The anode current of the tube 21 flows through the resistance 22 causing a decrease in the anode voltage of the tube 21 and accordingly a decrease of the potential of the cathodes of the rectifier tube 13. Accordingly the direct current flowing in the windings 12 is increased. This reduces the reactance of the choke coils 11 and the current in the stator winding 1 of the brake lifting motor is increased. Accordingly more torque is developed to turn the rotor 2 in a direction to retract the brake shoe 6 from the brake drum 8. Thus the brake is released slightly to prevent undesired deceleration of the car 41. A desired retardation is established by the positive initial voltage applied to the cathode of the tube 21 and this tension is obtained from the potentiometer 19.

The condenser 27 which was charged by the generator 26 during acceleration of the elevator car 41 discharges through the resistance 24 during retardation of the elevator cage 41. The potential applied to the control grid of the tube 21 is determined primarily by the voltage drops across the resistances 24 and 25. The voltage drop across the resistance 24 is dependent upon the current flowing in the circuit which includes the generator 26 the condenser 27 and the resistance 24. This current is proportional to a variation of the speed at which the generator 26 is driven and accordingly proportional to the speed of the elevator car 41. Thus the voltage at the terminals of the generator 26 corresponds to the speed of the elevator car. The voltage across the resistance 24 is therefore proportional to the retardation of the elevator cage 41. During the retarding period the potential applied to the grid of the tube 21 is so adjusted that the rectifier tubes 13 function to control the flow of direct current through the windings 12 in relationship to the retardation of the elevator car. The circuit elements which influence the bias of the grid of the tube 21 are so designed in relation to one another that the voltage drop across the resistance 24 controls the value of the direct current flowing through the windings 12 so that the retardation action of the brake remains substantially constant.

When the speed of the elevator car 41 has attained a desired low rate of movement suitable for stopping at a floor level the voltage between the cathode and the grid of the tube 29 becomes sufficiently negative that the tube 29 commences to operate. This occurs when the difference between the voltage tapped from the potentiometer 20 and the voltage at the terminals of the generator 32 is so small that the grid of the tube 29 allows electrons to pass to the anode. The plate current of the tube 29 creates a voltage drop across the resistance 25 thereby raising the potential applied to the grid of the tube 21. Accordingly the flow of direct current in the windings 12 is increased. The impedance of the choke coils 11 is then thereby reduced and the flow of alternating current in the stator windings 1 is increased. The rotor 2 is then rotated slightly against the action of the spring 7 to withdraw the brake shoe 6 from engagement with the brake drum 8. The brake is thereby released and a constant slow speed is attained suitable for stopping at the floor level desired. It is to be noted that the bias of the control grid of the tube 29 is dependent upon the voltage of the generator 32 which in turn is dependent upon the speed at which the elevator car 41 is moving. The plate current of the tube 29 consequently depends upon the speed of the elevator car and the action of the brake is accordingly controlled by the value of the current flowing in the windings 12 through the control of the rectifier tubes 13.

Just before the elevator car 41 reaches the exact floor level the switch 34 is moved from the position shown in the drawings so as to connect the condenser 33 to the adjustable resistor 35. The condenser 33 having been charged with voltage from the potentiometer 20 then discharges through the resistance 35. The grid of the tube 29 is again biased negatively. The plate current of the tube 29 is decreased and therefore the voltage drop across the resistance 25 is also reduced. The grid of the tube 21 is then biased negatively so that less direct current flows in the windings 12. The reactance of the choke coils 11 is increased so that less current flows in the stator winding 1. The spring 7 is capable of moving the brake shoe 6 into engagement with the brake drum 8 to stop movement of the elevator car. The rate of discharge of the condenser 33 and accordingly the retardation leading to the final stop of the elevator car is dependent upon the value of the resistance 35.

The switch 37 is then opened to disconnect the driving motor 36 and the switch 9 is also opened to disconnect the stator windings 1 from the alternating current supply line. The brake shoe 6 is held in engagement with the periphery of the drum 8 by the spring 7 in order to maintain the elevator car at a standstill.

The generator 23 which is coupled to the brake lifting motor by means of a mechanical connection as represented at 40 has small rotational movements corresponding to those of the rotor 2. The generator 23 serves to stabilize the circuit arrangement and by so operating that the action of the generator 23 is in opposition to any variations of speed and damps action in the control circuit.

Having now particularly described and ascertained the nature of my invention and the manner in which the mechanism is to be performed I declare that what I claim is:

1. A brake system for an elevator car driven by a three phase induction motor with a slip ring rotor comprising, a brake drum driven by the car, brake shoe means, spring means urging the brake shoe means into engagement with said drum, a motor including a stator for retracting said shoe means against the action of said spring means, a three phase supply, means connecting said motor to said supply to provide excitation thereof during a braking period, a magnetic core, choke coils and windings in inductive relationship with said core, means for connecting said stator in delta through said choke coils, a rectifier connected to said windings, an electron tube having an anode and a cathode and a control grid, a direct current source, a resistor, a circuit connecting said resistor to said anode and the positive side of said source, adjustable means providing a partial voltage of said source, a circuit connecting said cathode to said partial voltage, a second resistor, a circuit extending from said control grid through said second resistor to said partial voltage, a tachometer generator driven by movements of said car, a condenser, means connecting said condenser in series with said generator, and means connecting said generator and condenser in parallel with the second resistor.

2. A brake system as claimed in claim 1, characterized in that the control grid circuit of said tube includes a further resistor connected to the cathode of a second tube having an anode and a cathode and a control grid, the last anode being connected through a resistor with said positive side of said source, and the last control grid being connected through a second tachometer generator driven by the car with a condenser which by means of a switch may be connected either with an adjustable partial voltage of said source or through an adjustable resistor with a negative side of said source.

3. A brake system as claimed in claim 1, characterized in that between said first tachometer generator and the condenser the cathode of a further tube is connected which is provided with an anode and a cathode and a control grid, the last anode being connected through a resistor with the positive side of said source and the control grid thereof being connected to a condenser which by means of a switch may be connected either with a partial voltage of said source or through an adjustable resistor with the negative side of said source.

4. A brake system as claimed in claim 1, characterized in that the control grid circuit of the tube comprises a tachometer generator mechanically coupled to a rotor of said motor.

References Cited in the file of this patent

UNITED STATES PATENTS

| | | |
|---|---|---|
| 2,117,839 | Chubb | May 17, 1938 |
| 2,278,120 | Schwarz | Mar. 31, 1942 |
| 2,421,187 | Derungs | May 27, 1947 |
| 2,440,319 | Wickerham | Apr. 27, 1948 |
| 2,627,597 | Johansson | Feb. 3, 1953 |